United States Patent Office 3,302,326
Patented Feb. 7, 1967

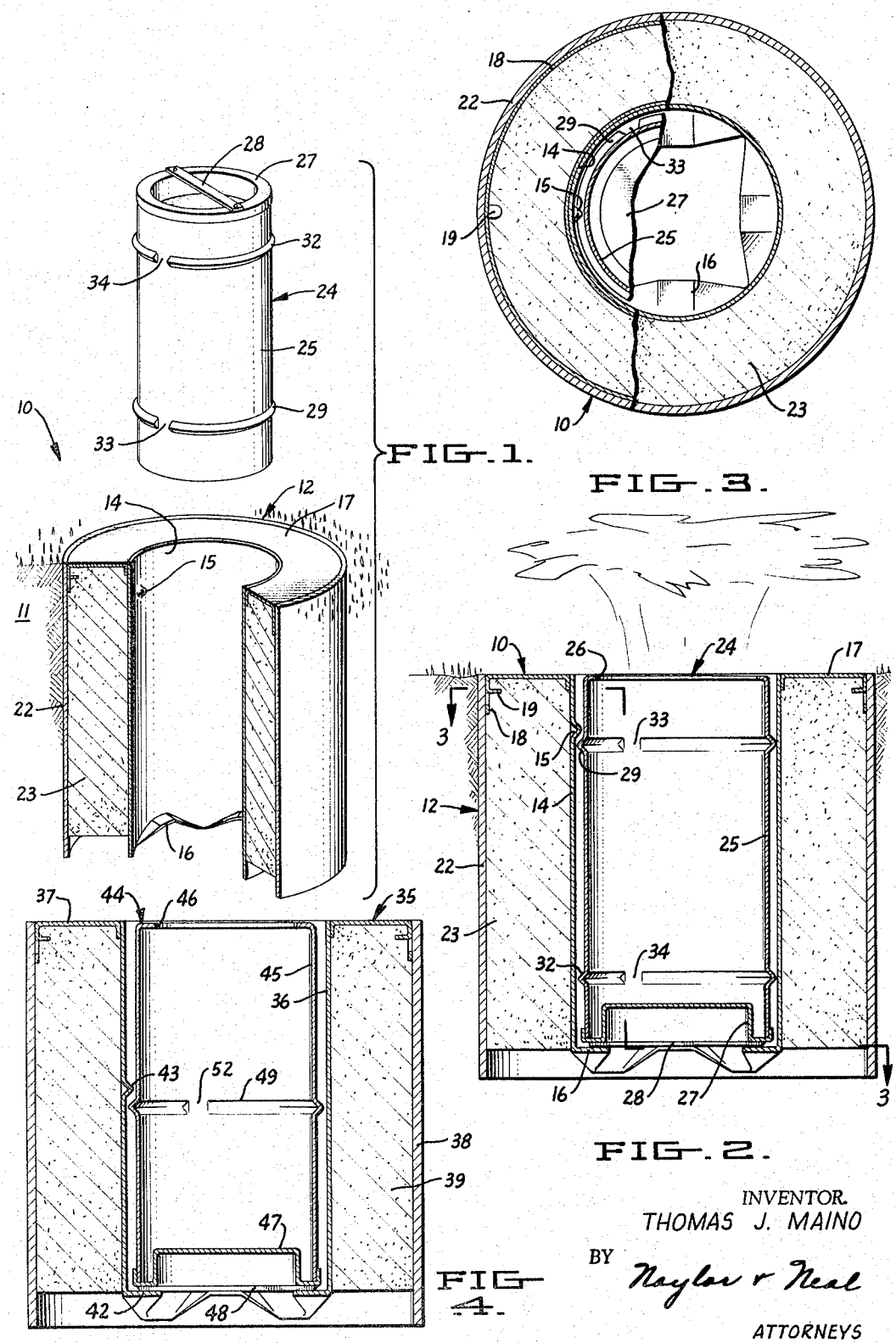

3,302,326
REVERSIBLE FLOWER CONTAINER
Thomas J. Maino, 1430–32 Valencia St.,
San Francisco, Calif. 94110
Filed May 21, 1964, Ser. No. 369,178
1 Claim. (Cl. 47—41.1)

The present invention relates to a flower container and more particularly is directed to such a container adapted to be installed flush with the surface of the ground with the flower holding receptacle thereof reversible between open and closed positions.

Flower containers for use in cemeteries, and particularly military cemeteries, have the requirement that they be flush with the ground in order to permit the passage of maintenance vehicles, such as lawn mowers, thereover. It is also required that the flower holding receptacles of such containers be lockable in place so as to prevent gophers from pushing them from the ground and to avoid theft. In addition to these requirements, many cemeteries require provision to close the top of the flower holding receptacle when not in use. The latter provision avoids the tripping hazard imposed by the open receptacle.

It is, accordingly, the principal object of this invention to provide a flower container for use in cemeteries which satisfies the aforementioned requirements.

Another object of the invention is to provide such a container which is durable in construction and facilitated for ease of installation and use.

With respect to the latter object, it is yet another object of the invention to provide such a flower container which does not accumulate water and debris when not in use.

Basically, the objects of the present invention are accomplished through the provision of a flower container adapted for flush installation in the ground and having the flower holding receptacle thereof reversible between open and closed positions. The structure of the container includes a weighted base member having a cylindrical opening therethrough between the top and bottom thereof and a tubular receptacle adapted to be slidably received in the opening and having the opposed ends thereof open and closed, respectively. The basic structure of the container is completed by detents on the interior and exterior of the opening and receptacle, respectively, to lock the receptacle in the opening selectively with either of said opposed ends in substantially flush relationship with the top of the base member.

The detailed structure and the foregoing and other objects of the invention will be more apparent when viewed in light of the accompanying drawings, wherein:

FIG. 1 is an exploded perspective view, partially in section, of one embodiment of the flower container;

FIG. 2 is an elevational view in vertical section of the embodiment of the container shown in FIG. 1;

FIG. 3 is a sectional view taken on line 3—3 of FIG. 2; and,

FIG. 4 is an elevational view in vertical section of another embodiment of the container.

Referring now to the embodiment of the invention illustrated in FIGS. 1–3, the container therein is designated in its entirety by the numeral 10 and is shown installed in flush condition in the ground 11. The portion of the container permanently installed in the ground comprises a weighted base member 12 of generally cylindrical configuration having an opening extending longitudinally therethrough defined by a metallic tube 14. The tube 14 is formed with an inwardly extending detent protrusion 15 and an inwardly turned stop edge 16 adjacent its upper and lower ends, respectively. A metallic cap 17 of generally annular configuration extends radially from the upper end of the tube 14 and has formed around the outer periphery thereof a downwardly turned rim 18 with inwardly bent tabs 19 at spaced locations therearound. A composition sleeve 22 extends downwardly from the rim 18 in concentric relationship with the tube 14 so as to define an annular chamber into which concrete may be set.

The construction of the base member 12 is particularly desirable, since the concrete 23 therein performs both a reinforcing function and a weighting fuction. It is noted that the concrete may be readily set in the condition illustrated by simply turning the base member upside down and pouring concrete into the annular space defined between the tube 14 and sleeve 22. Since the sleeve 22 is only necessary to support the concrete 23 during the initial pouring thereof, it is preferable to form the sleeve of a relatively inexpensive and decomposable material, such as cardboard. The tabs 19 and other irregularities on the metallic portions of the base member 12 assure that the concrete 23 will remain affixed thereto, even after the sleeve 22 has decomposed.

The flower holding receptacle adapted for use with the aforedescribed base member 12 is designated in its entirety by the numeral 24 and is shown with its closed bottom portion facing upwardly in FIG. 1 and its open top portion facing upwardly in FIG. 2. The receptacle is essentially a metallic tube 25 having an opening 26 at one end thereof and a recessed closure member 27 in sealing engagement with the other end thereof. The closure member 27 has a bar 28 fixed thereto and extending diametrically thereacross to facilitate turning and lifting of the receptacle when in the inverted position illustrated in FIG. 1.

As can be seen from FIG. 2, the tube 25 has a diameter sufficiently less than that of the tube 14 so as to be loosely slidable thereinto. Rings 29 and 32 are pressed into the tube 25 and extend outwardly therefrom adjacent the upper and lower ends thereof, respectively. Each of the rings 29 and 32 has an external diameter closely approaching the internal diameter of the tube 14 so as to preclude dirt and other foreign material from passing thereby when the receptacle 24 is nested in the base member 12 as illustrated in FIG. 2. The latter characteristic is particularly desirable, since it prevents dirt and other foreign material from building up between the base member and receptacle. The rings 29 and 32 are interrupted as indicated at 33 and 34, respectively, so as to define spaced end portions between which the protrusion 15 may pass. Thus, with the interruptions 33 and 34 in alignment with the protrusion 15, rectilinear movement may be imparted to the receptacle 24 to either lower it into the tube 14 or remove it therefrom. Once the receptacle 24 is lowered into the tube 14, rotating of the receptacle about its longitudinal axis will function to move the upwardly disposed of the rings 29 and 32 in opposition to the protrusion 15, thus locking the receptacle 24 in the base member 12.

Although the receptacle 24 has only been illustrated with the ring 29 thereof in opposition to the protrusion 15, it is to be understood that the receptacle may be inverted to the position illustrated in FIG. 1 and locked within the base member with the ring 32 in opposition to the protrusion 15. The interruptions 33 and 34 are shown as being in axial alignment so as to facilitate ease of rectilinear movement of the receptacle 24 with respect to the base member 12. It is possible, however, that these interruptions may be formed so as to be out of axial alignment without departing from the invention herein described. In the latter case, it would be necessary to rotate the receptacle 24 between the times the interruptions are passed by the protrusion 15.

From the foregoing description it is believed apparent that the receptacle 24 may be readily locked within the base member 12 with either the open or closed end thereof facing upwardly. With the open end facing upwardly as shown in FIG. 2, the ring 29 is below and in opposition to the protrusion 15 and the closure member 27 is resting on the stop edge 16. In the reverse position with the closure member 27 facing upwardly, the ring 32 would be below and in opposition to the protrusion 15 and the open end of the receptacle would rest on the stop edge 16.

Referring now to FIG. 4, therein is illustrated an embodiment of the invention differing from that of FIGS. 1–3 only in that modified detent means are provided to hold the receptacle within the base member thereof. The base member in the FIG. 4 embodiment is designated in its entirety by the numeral 35 and comprises a tube 36, cap 37, sleeve 38, and concrete filler 39. All of the latter elements are interrelated in a manner identical to that of the corresponding elements described with reference to the FIGS. 1–3 embodiment. The tube 36 is also similar to the tube 14 in that it includes an inturned stop edge 42 and an inwardly extending detent protrusion 43. The protrusion 43 differs from the protrusion 15 in that it is located at a mid-point between the ends of the tube, rather than adjacent the upper end thereof.

The receptacle of the container of the FIG. 4 embodiment is designated in its entirety by the numeral 44 and corresponds to the aforedescribed receptacle 24 in that it includes a tube 45 having an opening 46 at the upper end thereof and a recessed closure member 47 sealingly secured to its lower end. A bar 48 is fixed to and extends over the member 47 to facilitate handling of the receptacle 44 when inverted from the position illustrated in FIG. 4. The receptacle 44 differs from the aforedescribed receptacle 24 in that it includes only one detent ring, designated by the numeral 49, extending around the tube 45. The detent ring 49 is positioned midway between the ends of the tube 45 and is interrupted at 52 to define spaced end portions which are adapted to pass by the detent protrusion 43.

In operation of the FIG. 4 embodiment, it is merely necessary to align the protrusion 43 with the interruption 52 to facilitate rectilinear movement of the receptacle 44 in and out of the base member 37. Once the receptacle 44 is positioned in the base member 37, it may be locked in place simply by turning the tube 45 about its longitudinal axis to bring the ring 49 into opposition with the protrusion 43. Although the receptacle is only illustrated in a position wherein the opening 46 is facing upwardly and the closure member 47 is resting on the stop edge 42, it is to be understood that this position may be inverted. When so inverted, the ring 49 is positioned below and in opposition to the protrusion 43 and the open end of the tube 45 rests on the stop edge 42. Inverting of the receptacle 44 in this manner is possible because the distance between the ring 49 and the respective ends of the tube 45 is less than that between the protrusion 43 and the stop edge 42.

It is noted that the detent ring 49 is similar to the detent rings 29 and 32 in that it has a diameter closely approaching that of the tube 36 in which it is received. It is believed apparent, however, that the use of the single ring 49 cannot preclude the passage of dirt between the receptacle and the base member to the same degree as the pair of rings 29 and 32.

Accordingly, the container of the FIGS. 1–3 embodiment is preferred where the build-up of dirt or other foreign matter between the receptacle and base member presents a particular problem.

To conclude, from the foregoing detailed description it is believed apparent that the present invention enables the accomplishment of the objects initially set forth herein. In particular, an improved flower container adapted to be locked in flush condition with the surface of the ground in either closed or open positions has been provided. It is to be understood, however, that the invention is not intended to be limited to the specific embodiments illustrated and described, but rather is defined by the following claim.

What is claimed is:

A flower container, comprising:
(a) a weighted base member having a cylindrical opening therethrough between the top and bottom thereof;
(b) a tubular receptacle adapted to be slidably received in said opening, said receptacle having the opposed ends thereof open and closed, respectively, and having a length substantially equal to that of said opening; and,
(c) means to selectively retain said receptacle in said opening with either of the opposed ends thereof in substantially flush relationship to the top of said base member, said means comprising:
  (1) a stop shoulder fixed relative to and extending from the lower portion of said base member for abutting engagement with the lower edge of said receptacle upon receipt thereof in said opening;
  (2) an interrupted ring fixed to and extending outwardly around said receptacle in equi-spaced relationship to the ends thereof, said ring being adapted to slide within said opening and having end portions defining therebetween a groove; and,
  (3) a protrusion fixed to said base member and extending into the opening thereof at a location spaced from said stop shoulder by a distance slightly greater than that between said ring and the ends of said receptacle, said protrusion being adapted to pass through said groove and over said ring upon rectilinear and rotational movement, respectively, of said receptacle relative to said base member.

References Cited by the Examiner

UNITED STATES PATENTS

| | | | |
|---|---|---|---|
| 1,907,775 | 5/1933 | Flook | 47—41.1 |
| 2,068,290 | 1/1937 | Hagle | 47—41.1 |
| 3,016,594 | 1/1962 | Jacomaro | 47—41.1 |

ABRAHAM G. STONE, *Primary Examiner.*

P. RAZZANO, *Assistant Examiner.*